UNITED STATES PATENT OFFICE.

KONSTANTIN LÖRINCZ, OF BUDAPEST, AUSTRIA-HUNGARY, ASSIGNOR TO THE FIRM OF LÖRINCZ FESTEKGYÁR (TOPP) BETÉTI TÁRSASÁG, OF BUDAPEST, AUSTRIA-HUNGARY.

PROCESS FOR PRODUCING PAINTS AND OTHER COATINGS.

No. 894,159.    Specification of Letters Patent.    Patented July 21, 1908.

Application filed July 20, 1907. Serial No. 384,818.

*To all whom it may concern:*

Be it known that I, KONSTANTIN LÖRINCZ, a subject of the King of Hungary, and residing at Budapest, Austria-Hungary, have invented certain new and useful Improvements in the Processes for Producing Paints and other Coatings, of which the following is a full, clear, and exact description.

The present invention consists of a process for producing paints and other coatings, the object being to provide a paint or wash which shall combine the advantages of the lime and oil colors, *i. e.* which shall be durable, weather-proof, will not rub off and will not close up the pores of the object to which it is applied, is capable of being washed and will not collect dust. The paint produced by the present process may be dull or glassy as may be required.

The process is carried out in the following manner:—About 100 parts of lime are slaked with about 400 parts of water and one part of extract of tobacco lye (a basic watery extract of tobacco having a density of about 68 Baumé) and one part of iron vitriol are added. After the slaking operation the whole is filtered and allowed to stand for about one month. At the end of this period, the water which has collected at the top is poured off. To the thick mass thus obtained, the following mixture is added:—5 parts of paraffin, 5 parts of ceresin, 8 parts of wax, 8 parts of raw alcohol, 1 part of tallow and 1 part of glycerin are all melted down together and the mixture allowed to cool down to about 25° C. whereupon a mixture is added consisting of 50 parts of ordinary petroleum of a specific gravity of about 0.7, 20 parts of turpentine oil and 6 parts of linseed oil. The whole, when cool forms a gelatinous mass (fats) of which from 10 to 30 parts are added to the mixture of lime, water tobacco lye extract and iron vitriol above described and the whole thoroughly mixed together, until the lime has entirely taken up the fats. This mass may be diluted according to requirement. It forms an emulsion without saponification, is snow-white, which latter quality is attained by adding sufficient quantities of petroleum and turpentine oils to prevent the lime mixture from turning brown. Any desired color may be imparted to the mass, which will have a bright or glassy surface owing to wax therein, when coated on to the surface to be painted.

In order to produce a paint from 10 to 40 parts of the above described mixture are added to about 100 parts of ordinary oil paint.

I claim as my invention:—

1. A process for producing a coating medium or paint, which consists in adding to a mixture of slaked lime, extract of tobacco lye and iron vitriol, a mixture consisting of paraffin, ceresin, wax, raw alcohol, tallow and glycerin, as also petroleum and turpentine oils and linseed oil and thoroughly and intimately mixing the same substantially as described.

2. A process for producing a coating medium or paint, which consists in adding to a mixture of slaked lime, extract of tobacco lye and iron vitriol, a mixture consisting of paraffin, ceresin, wax, raw alcohol, tallow and glycerin, as also petroleum, turpentine and linseed oils, thoroughly mixing and finally mixing from 10 to 40 parts of the said resultant mass to 100 parts of ordinary oil paint, substantially as described.

In testimony whereof I affix my signature in the presence of two witnesses.

KONSTANTIN LÖRINCZ.

Witnesses:
 JOSEF WIEKMANN,
 CHARLES EDWARD ZALUND.